(12) United States Patent
Glasband

(10) Patent No.: US 6,278,266 B1
(45) Date of Patent: Aug. 21, 2001

(54) SYMMETRICAL POWER GENERATOR AND METHOD OF USE

(76) Inventor: Martin S. Glasband, 5628 Lakeshore Dr., Selma, OR (US) 97538

( * ) Notice: Subject to any disclaimer, the term of this patent is extended or adjusted under 35 U.S.C. 154(b) by 0 days.

(21) Appl. No.: 09/568,217

(22) Filed: May 9, 2000

Related U.S. Application Data

(60) Continuation-in-part of application No. 08/848,123, filed on Apr. 28, 1997, now Pat. No. 6,060,876, which is a division of application No. 08/261,814, filed on Jun. 17, 1994, now Pat. No. 5,640,314.

(51) Int. Cl.[7] ........................................... H01F 17/00
(52) U.S. Cl. ................................................. 323/355
(58) Field of Search ................................. 323/355, 359, 323/247, 255, 258; 363/34, 36, 84, 125, 171; 336/150, 192

(56) References Cited

U.S. PATENT DOCUMENTS

| | | | |
|---|---|---|---|
| 4,437,147 | * | 3/1984 | Takamura et al. ................. 363/61 |
| 4,584,637 | * | 4/1986 | Takamura et al. ................. 363/61 |
| 4,675,801 | * | 6/1987 | Terada ............................. 363/143 |
| 5,140,705 | * | 8/1992 | Kosuga ........................... 455/138 |
| 5,386,473 | * | 1/1995 | Harrison ........................... 381/24 |
| 5,615,091 | * | 3/1997 | Palatnik .......................... 363/17 |
| 5,900,764 | * | 5/1999 | Imam et al. ..................... 327/343 |

OTHER PUBLICATIONS

Morrison, "Grounding and Shielding Techniques in Instrumentation"; Dynamics Instrumentation Company; John Wiley and Sons, Inc.; New York, London, Sydney; pp. 81–85, 1967.

* cited by examiner

*Primary Examiner*—Matthew Nguyen
(74) *Attorney, Agent, or Firm*—Larson & Taylor, PLC

(57) ABSTRACT

A power generator and method of use for providing symmetrical power. In the present invention, the output winding of a generator is center-tapped at the point of mean voltage differential between each of its two output terminals. The center-tap is grounded such that one-half of the output potential appears across each half of the output winding. Full, symmetrical voltage is applied to the load when the output terminals are connected to the load and the load is grounded.

4 Claims, 10 Drawing Sheets

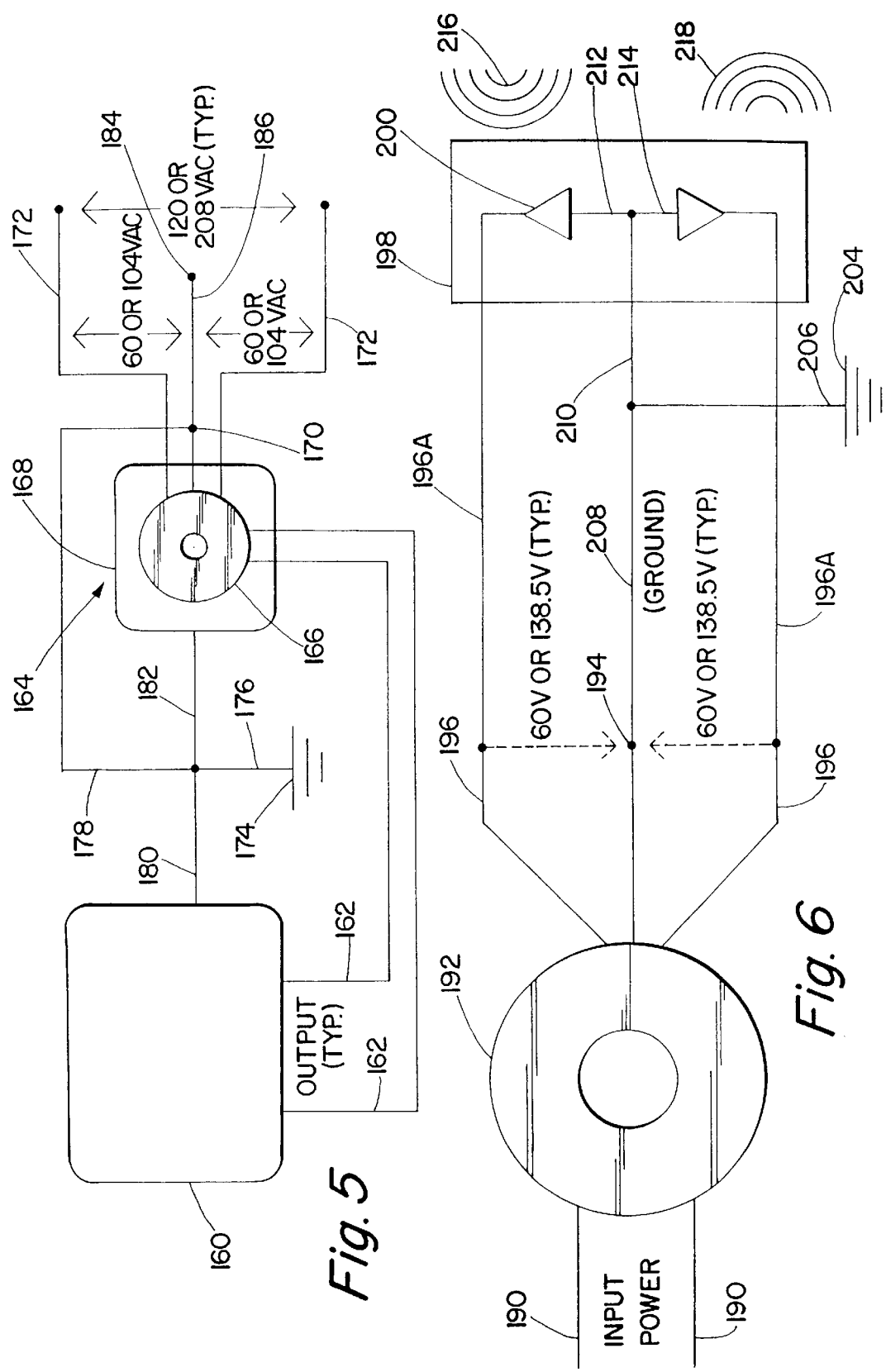

SYMMETRICAL POWER GENERATOR AND METHOD OF USE

This application is a continuation in part of U.S. application Ser. No. 08/848,123, filed Apr. 28, 1997, now U.S. Pat. No. 6,060,876, which is a divisional application of U.S. application Ser. No. 08/261,814, filed Jun. 17, 1994, now U.S. Pat. No. 5,640,314. Both of these applications are incorporated herein by reference.

FIELD OF THE INVENTION

This invention relates to the reduction of electrical interference in the environment and in the operation of electronic equipment, and more specifically, to a generator power system that is uniquely configured and referenced to operate sensitive electronics and other impedance loads in a manner which inhibits the propagation of most electrical interference.

BACKGROUND OF THE INVENTION

Over the past several years, the use of symmetrical AC power has gained a foothold in some industries that are dependent on the field of power quality, the part of the electrical power industry that deals with the quality of power as it affects the performance of sensitive electronics. Conventional AC power, as it is presently being used, requires that at least one of the circuit wires be grounded as AC power is distributed to single-phase loads. In some cases, the frame or chassis of the load is used as a circuit conductor, similarly to how automobiles are typically wired, the chassis being not only used as a ground, but also a conductor through which current flows, to facilitate the operation of various electrical apparatuses in the vehicle. In similar situations, where a generator is used to power electronics, an analogous method of power distribution is used. One of the circuit wires is either grounded or is absent entirely in lieu of using the chassis or frame of the load as a circuit conductor. Consequently, reactive load currents flow through the frame or chassis. These currents often cause sensitive electronics to malfunction or to work improperly. One solution to the problem would be to install a symmetrical power transformer of the type described below and in the parent application (Ser. No. 08/848,123; "the parent application") on the output of the generator, thus placing the grounding reference for the system at a point midway between the two "hot" conductors of the circuit and thusly balancing out or nulling reactive load currents.

The major drawback to this type of power system configuration is the additional weight and expense of adding a transformer to a generator's output. If for example, such a generator/transformer combination were to be connected to sensitive electronic equipment installed on an airplane, the weight and space requirements could pose difficult problems to overcome for aircraft designers.

SUMMARY OF THE INVENTION

A much more efficient and cost effective way of providing the same type of power is to utilize the output windings of the generator to configure an "isolation transformer" of the type described in FIG. 4 below. This device then provides the benefits of symmetrical power in a generator environment without the extra weight and expense of a separate symmetrical power transformer.

An alternate configuration of the symmetrical power generator described herein is a similar generator with its output windings configured in a symmetrical power six-phase wye arrangement, as described in U.S. Pat. No. 5,969,510, to the inventor of the basic invention, and which is incorporated herein by reference.

The invention herein utilizes conventional generator designs and principles that are customarily used in the manufacture of generators with unbalanced outputs or generators who's output have been distributed in all unbalanced voltage manner by means of using a grounded circuit conductor. The primary distinction between prior art and this invention is the application of the symmetrical power output windings on the generator and the resulting symmetrical voltage output as it is fed through conventional means to sensitive electronics equipment and other sources of electrical noise that could cause malfunction in sensitive electronics.

BRIEF DESCRIPTION OF THE DRAWINGS

The invention may be more readily understood by referring to the accompanying drawing, in which:

FIG. 5 is a diagram illustrating the practice of the basic invention to provide a symmetrical power system to increase output signal stability and decrease distortion in the operation of dc-to-ac inverter systems and ac power conditioning systems so as to inhibit the distorting effects of nonlinear reactive loading on the inverter or power-conditioning circuitry;

FIG. 6 is a diagram illustrating the practice of the basic invention to attenuate RFI emissions from electronic circuits and components by providing symmetrical power from a symmetrical power system to the interference source so as to balance out RFI emissions;

DETAILED DESCRIPTION OF THE PREFERRED EMBODIMENTS

Figure 1:
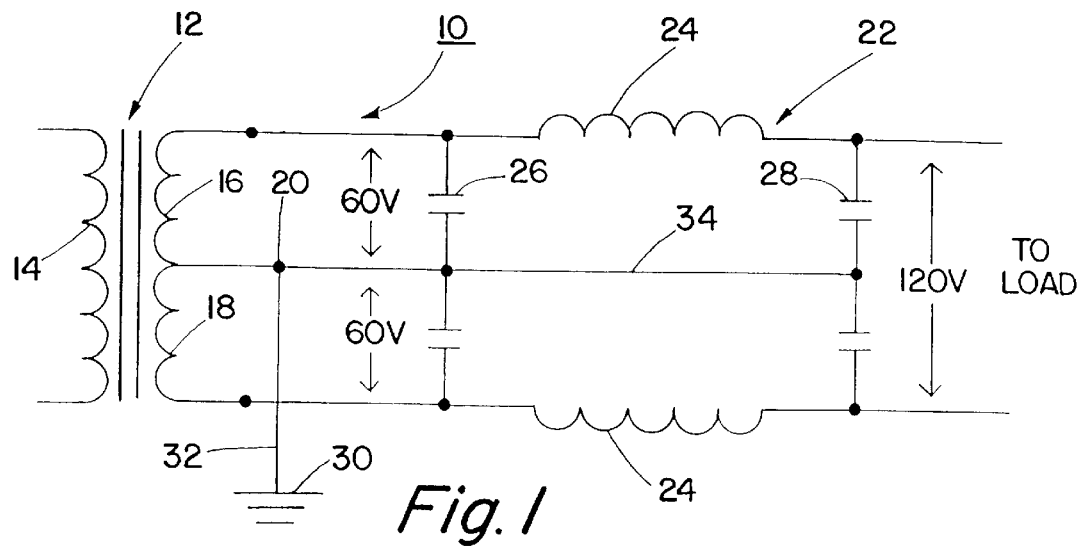
FIG. 1 is a wiring diagram illustrating a symmetrical power system for enhanced performance of conventional EMI and RFI line filters by providing a common-mode power signal which is more conjoined to the balanced design of a typical noise filter.

Referring now to FIG. 1, there is shown a schematic diagram for a symmetrical power circuit for enhanced performance of common EMI and RFI line filters by providing a common mode power signal which is more conjoined to the balanced design of a typical noise filter than has been possible in the prior art. In FIG. 1, a symmetrical power system 10 includes a transformer 12, which may be either an isolation transformer or a power transformer, which has an input-winding 14 and a pair of output-windings 16, 18, which constitute the secondary winding of the transformer 12. The output windings 16, 18 jointed at a center tap 20. In this embodiment of the practice of the invention, the secondary windings 16, 18 are bifilar-wound, although for purposes of ease of illustration in FIG. 1, the windings are shown as conventionally wound. An LC filter 22 consists of a pair of inductors 24, a pair of input capacitors 26, and a pair of output capacitors 28. An earth ground 30 is connected to the center tap 20 through an earth ground lead 32. The LC filter 22 has a ground lead 34 which is connected to the center tap 20.

In operation, an ac input signal is applied to the transformer input winding 14 and is of a magnitude such as to induce across the secondary windings 16, 18 an output of 120 volts. This 120 volt output is divided into two 60 volt increments, one across each of the output windings 16, 18. As will be apparent, the 60 volt output signals in the windings 16, 18 are 180 degree out of phase with one another. Current flow across the LC filter capacitors 26, 28, therefore, will be of equal, but opposite, magnitudes at the LC filter ground lead 34, so as to cancel out one another. Consequently, the ac output signal applied to the load will be a symmetrical power signal. The symmetrical power circuit shown in FIG. 1 provides a common mode fundamental voltage signal which is more compatible with balanced LC network type filter circuits than has been available heretofore. By virtue of the presence of equal, inversely-phased grounding currents, these currents fail to propagate in the usual manner in grounding circuits. Under load conditions, passive filters such as the filter 22 are more effective when symmetrical power is applied, due to the preponderance of easily filtered common-mode noise, as opposed to significant amounts of differential and transverse-mode noise resulting in such filters when non-symmetrical ac power is applied to the filter, which is much more difficult to remove from the filter output signal.

Figure 2:
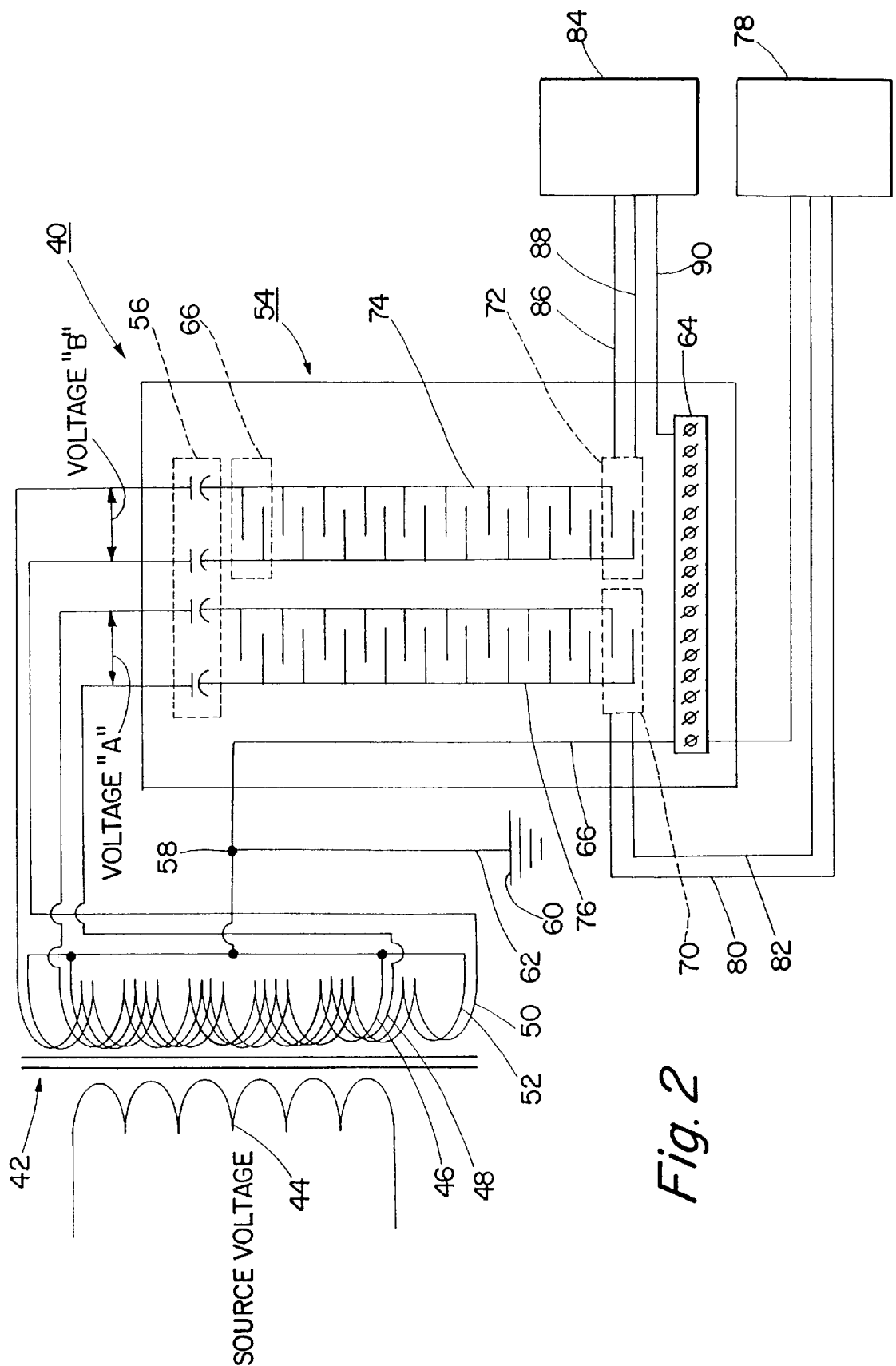
FIG. 2 is a schematic diagram illustrating the practice of the basic invention to provide a symmetrical power system for attenuation of electrical interference in a power system where more than one voltage or system is required by electric equipment to which the power is to be applied by providing a symmetrical power system having multiple balanced output voltage circuits derived from a single transformer.

Referring now to FIG. 2, there is shown a diagram of a symmetrical power distribution system which produces two separate symmetrical output voltages, and which may be of identical or of different magnitudes. In FIG. 2, a symmetrical power system 40 has a power transformer 42, which includes an input winding 44 to which a source voltage is applied. The transformer 42 has a first pair of bifilar output windings 46, 48 and a second set of bifilar wound output windings 50, 52. The ac output across the first set of output windings 46, 48 may be, for example, 120 volts and the output across the second set of output windings may be, for example, 208 volts, although, obviously, any desired voltage can be achieved by the selection of the appropriate ratio of output to input turns for the transformer 42. A symmetrical power output from the first set of output windings 46, 48 is designated voltage "A," and is applied to a power distribution panel 54 at a four pole common trip main circuit breaker 56, shown in dotted lines in FIG. 2. The power distribution panel 54 is conventional in construction.

The transformer 42 has a secondary winding center tap 58 which is common to both of the bifilar winding sets 44, 46 and 48, 50. The center tap 58 is connected to an earth ground lead 62. The power distribution panel 54 has a technical equipment grounding bus 64 to which the earth ground 60 is connected by a ground connector 66 extending between the center tap 58 and the grounding bus 64. For purposes of illustration, the power distribution panel 54 is shown to have three 2-pole common trip branch circuit breakers 68, 70, 72 installed, the circuit breakers 68 and 72 being installed in a voltage "B" portion 74 of the power distribution panel 54 and the circuit breaker 72 being installed in a voltage "A" portion 76 of the power distribution panel 54. A Load "A" 78 is energized from the circuit breaker 70 by a symmetrical ac voltage carried in "A" load conductors 80, 82 connected between the circuit breaker 70 and load "A" 78. An "A" load ground lead 84 is connected between Load "A" 78 and the technical equipment grounding bus 64 to provide a direct earth ground for Load "A" 78. A Load "B" 84 is similarly connected to the circuit breaker 72 by "B" load conductors 86, 88 and to the bus 64 by a "B" load ground lead 90. In this embodiment of the invention electrical interference in sensitive electronics equipment is reduced since the multiple symmetrical power outputs are derived from a single transformer so as to be more frequency and phase aligned by being inductively coupled to one magnetic flux source than is possible when multiple magnetic flux sources are used.

Figure 3:
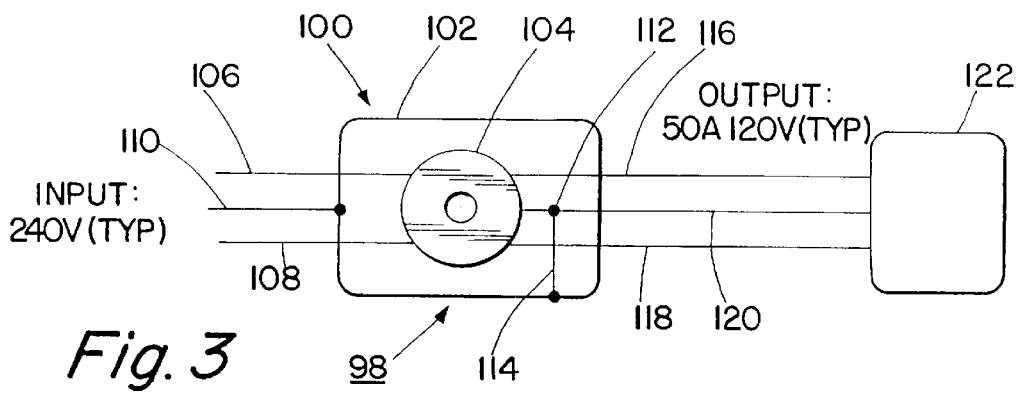
FIG. 3 is a diagram illustrating the practice of the invention to provide a symmetrical power system to distribute single-phase power to electronics equipment in a manner which is less dangerous to personnel than conventional single-phase circuits, by providing a symmetrical power circuit having a line-to-ground voltage which is only one-half of the voltage potential commonly distributed by conventional systems.

Referring now to FIG. 3, there is shown a diagram of a symmetrical power system according to the basic invention which provides for a reduced line-to-ground voltage potential over that line-to-ground voltage potential which is commonly utilized in conventional electric power distribution systems, thereby reducing the severity of the electrical shock danger otherwise existing in conventional single-phase circuits. The embodiment of FIG. 3 is especially useful for outdoor circuitry, and may be utilized to reduce the line-to-ground potential from 120 volts to 60 volts, while still providing a symmetrical power output signal of 120 volts. In FIG. 3, a symmetrical power supply system 98 has a voltage transformer 100, which includes a voltage transformer casing 102 within which a toroidal core 104 is contained. A source of input power, which may typically be 240 volts, although any other ac voltage can be used as desired, is applied across a pair of input leads 106, 108 and a ground lead 110. The transformer 100 is of the center-tapped secondary type, having a center tap 112, which is connected to the ground lead 110 by any conventional means. In the circular example shown in FIG. 3, the center tap 112 is connected to the transformer casing 102 by lead 114 and the ground lead 110 is directly connected to the transformer casing 102. The secondary of the voltage transformer 100 is preferably bifilar-wound for the reasons heretofore stated. The output of the secondary winding of the voltage transformer 100 is applied to a pair of output leads 116, 118 and a ground lead 120 and is symmetrical, such that the potential between the two output leads 116, 118 is one hundred and twenty volts and the potential between each of the output leads 116, 118 and the ground lead is sixty volts. The leads 116, 118, 120 are connected to a remote power distribution system 122 for distribution of the symmetrical power output of the voltage transformer 100 to electrical circuits to be energized thereby as single-phase power. However, as stated, the line-to-ground voltage potential in the 120 volt remote power distribution system 122 is only 60 volts, rather than 120 volts, as is the case in conventional power distribution systems of this type.

Figure 4:
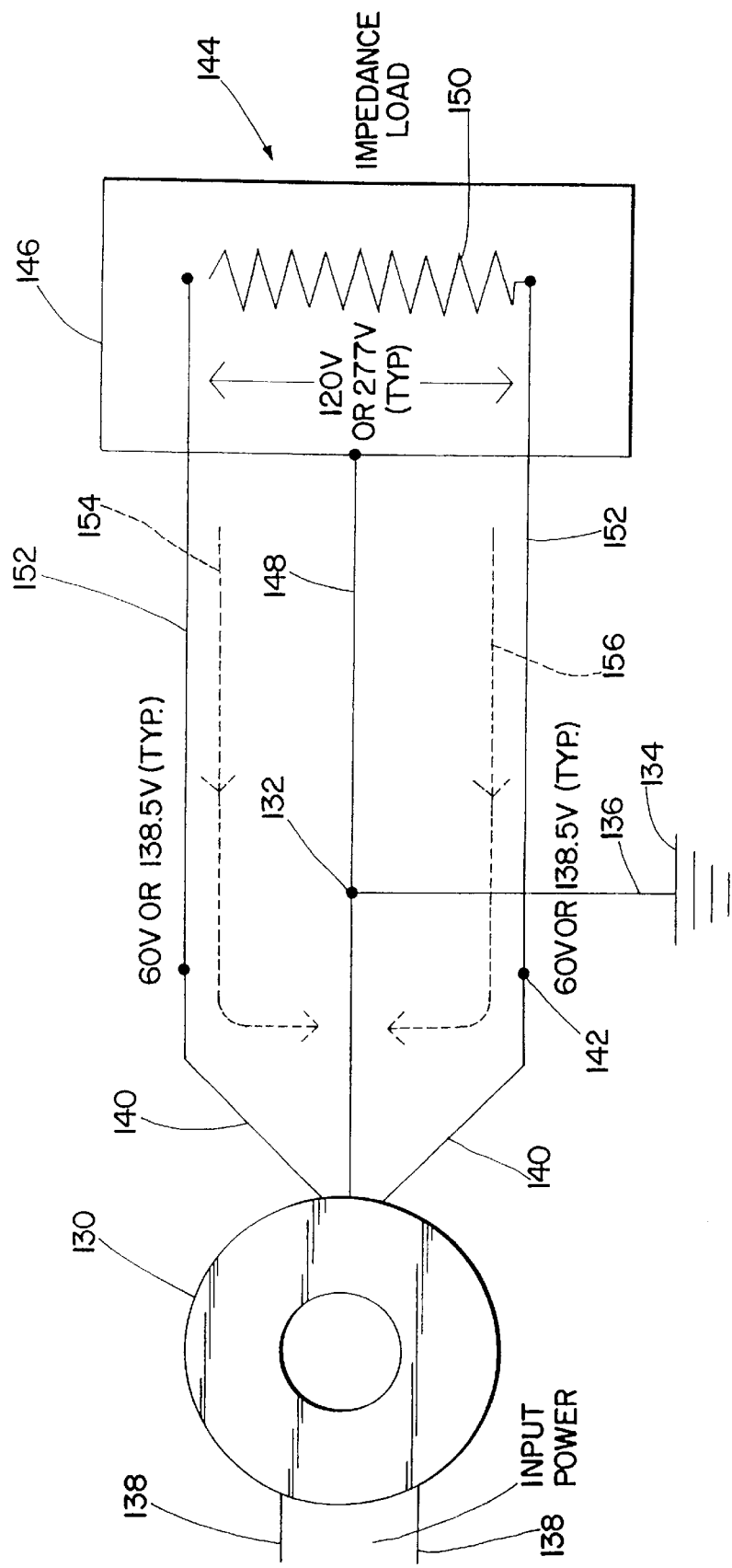
FIG. 4 is a diagram of a circuit for use in the practice of the basic invention to provide a symmetrical power system to attenuate power distortion by applying symmetrical power circuits to impedance loads such as fluorescent lighting systems and computer equipment power supplies so as to balance reactive load currents and other power artifacts with respect to ground.

Referring now to FIG. 4, there is shown a diagram of a symmetrical power system according to the basic invention for attenuating power distortion in an impedance load by applying symmetrical power to the load. Examples, of impedance loads which will benefit from the use of the embodiment of FIG. 4 are fluorescent lighting systems and computer equipment power supplies. The symmetrical power system shown in FIG. 4 functions to balance reactive load currents and other power artifacts with respect to ground so that these currents and artifacts cannot thereafter propagate noise or other interference in the usual manner, but instead sum to zero or null at the system's common grounding terminal by virtue of the equal presence of inversely phased reactive current, loads and other power artifacts in the power circuit. In FIG. 4, input ac power is applied to a transformer 130, illustrated as having a toroidal core for purposes of convenience, but which may have any appropriate type of core, and which has a secondary winding (not shown) with a center tap 132 which is connected to an earth ground 134 by a ground connector 136. The transformer 130 has input leads 138 which apply input ac power to the transformer 130. The secondary winding output is applied by a pair of output leads 140 to a pair of output terminals 142. Typically, the potential between the terminals 142 may be 120 volts or 277 volts, although obviously any other voltage can be utilized as required by selection of the input power voltage and the turns ratio of the transformer 130. An impedance load 144 has a casing 146 which is connected to the center tap 132 by a ground lead 148. The impedance load 144 is shown in FIG. 4 as a resistor 150 for illustrative purposes, and, which is connected to the output terminals 142 by leads 152.

In operation, the input power applied to the transformer 130, produces a symmetrical output power which is illustrated as being either 120 volts or 277 volts, depending upon the transformer 130 characteristics, and which is applied to the impedance load 144. Reactive currents 154, 156, shown in dotted lines in FIG. 4, which are produced as a result of the application of symmetrical power to the impedance load 144, are applied to the center tap 132 and thus the earth-ground 134 as balancing currents. Any other power artifacts similarly are applied as balancing artifacts. Consequently, these currents and power artifacts cannot generate noise or other interference as otherwise is in the case in prior art power systems, but, rather, sum to zero at the center tap 132, the common grounding point of the circuit, by reason of the presence of equal inversely phased components at the center tap 132.

Referring now to FIG. 5, there is shown a diagram of a symmetrical power system according to the basic invention for providing increased output signal stability and less distortion in the operation of dc-to-ac inverter systems and ac power conditioning systems by interposing a symmetrical power system between the inverter or conditioning system and the load, so as to inhibit distorting affects of non-linear reactive loading on the inverter or power conditioning system by balancing and nulling, at the grounding reference, non-linear reactive load currents and related power artifacts, which would otherwise cause power distortion in the output applied to the reactive load. In FIG. 5, a dc-to-ac inverter system or power conditioning system 160 is illustrated as having an output of 208 volts ac for illustrative purposes. Obviously, any ac output voltage desired can be utilized. The system 160 has a pair of ac output leads 162 which apply the output of the system 160 as the input to a symmetrical power system 164 having a transformer 166 enclosed within a casing 168. The transformer 166 is shown for illustrative purposes as a toroidal transformer, although any type of transformer may be utilized. As has been described in the previous embodiments of the invention, the transformer 166 has a center tap 170 on a preferably bifilar-wound secondary winding (not shown) and a pair of secondary winding output leads 172. The transformer 166 has a primary winding (not shown) to which the inverter or a power conditioning system output leads 162 are connected so as to apply the output from such system to the primary winding of the transformer 166. Again in this embodiment, it is preferred that the transformer secondary be bifilar wound in order to maximize the beneficial effects of the basic invention. The turns ratio of the secondary winding to the primary winding is selected so as to provide an output potential across the output leads 172 of the desired amount, which may typically be either 120 or 208 volts ac. In the instance of a 120 volt ac output across the leads 172, the potential between either of the leads 172 and the ground connection 170 is 60 volts. Similarly, for a 208 volt ac output, the potential is 104 volts. An earth ground 174 is connected to the center tap 170 by a pair of grounding leads 176, 178. The inverter or power conditioning system 160 is connected to the earth ground 174 by a grounding lead 180 and the grounding lead 176. The transformer casing 168 is connected to the earth ground 174 by a grounding lead 182 and the grounding lead 176. The symmetrical system output has a grounding reference terminal 184 which is connected to the earth ground 174 by a grounding lead 186, the grounding lead 178, and the grounding lead 176. In FIG. 5, the symmetrical power system provided by the transformer 166 and its related circuitry converts the power signal from the inverter or power conditioning system from a transverse or differential mode into a common mode, so as to provide for the basic invention's increased output signal stability and decreased distortion in the power output from the inverter or power conditioning system which is applied to the reactive load.

Referring now to FIG. 6, there is shown a diagram of a symmetrical power system according to the basic invention for attenuating electromagnetic interference (EMI) and/or radio frequency interference (RFI) emissions from electronic circuits and components by applying symmetrical power to the load. The symmetrical power system shown in FIG. 6 functions to balance the EMI and/or RFI emissions from the load so that they cannot thereafter propagate in the usual manner, but instead collapse by virtue of the presence of equal inversely-phased EMI and/or RFI emissions. In FIG. 6, input ac power is applied to the input winding leads 190 of a transformer 192 having an input winding (not shown) and an output winding (not shown) which has a center tap 194 and output winding leads 196. As in the previously described embodiments, transformer 192 is preferably of the bifilar-wound secondary type in order to maximize the advantages provided by the basic invention. The output between the output windings 196 is determined by the magnitude of the input signal applied to the input winding leads 190 and the turns ratio between the primary and secondary windings and may be, typically, 60 volts or 128.5 volts ac, although any other voltage required may be provided by appropriate input voltage selection and transformer winding ratio selection. An interference emitting load 198 has a pair of balanced-load elements illustrated as amplifiers 200, 202, to which the common mode power signal from the secondary transformer leads 196 is applied by signal leads 196A. An earth ground 204 provides a reference ground for the symmetrical power system shown in FIG. 6 and is connected to the secondary winding center tap 194 by ground leads 206, 208 and to the amplifiers 200, 202 by the ground lead 206 and ground leads 210 and 212, 214, respectively. As is shown in FIG. 6, when the system is in operation, the loads 200, 202 generate inversely-phased interference emissions indicated by the concentric semi-circles 216, 218, which balance one another out so as to effectively null out the interference emissions.

Figure 7:
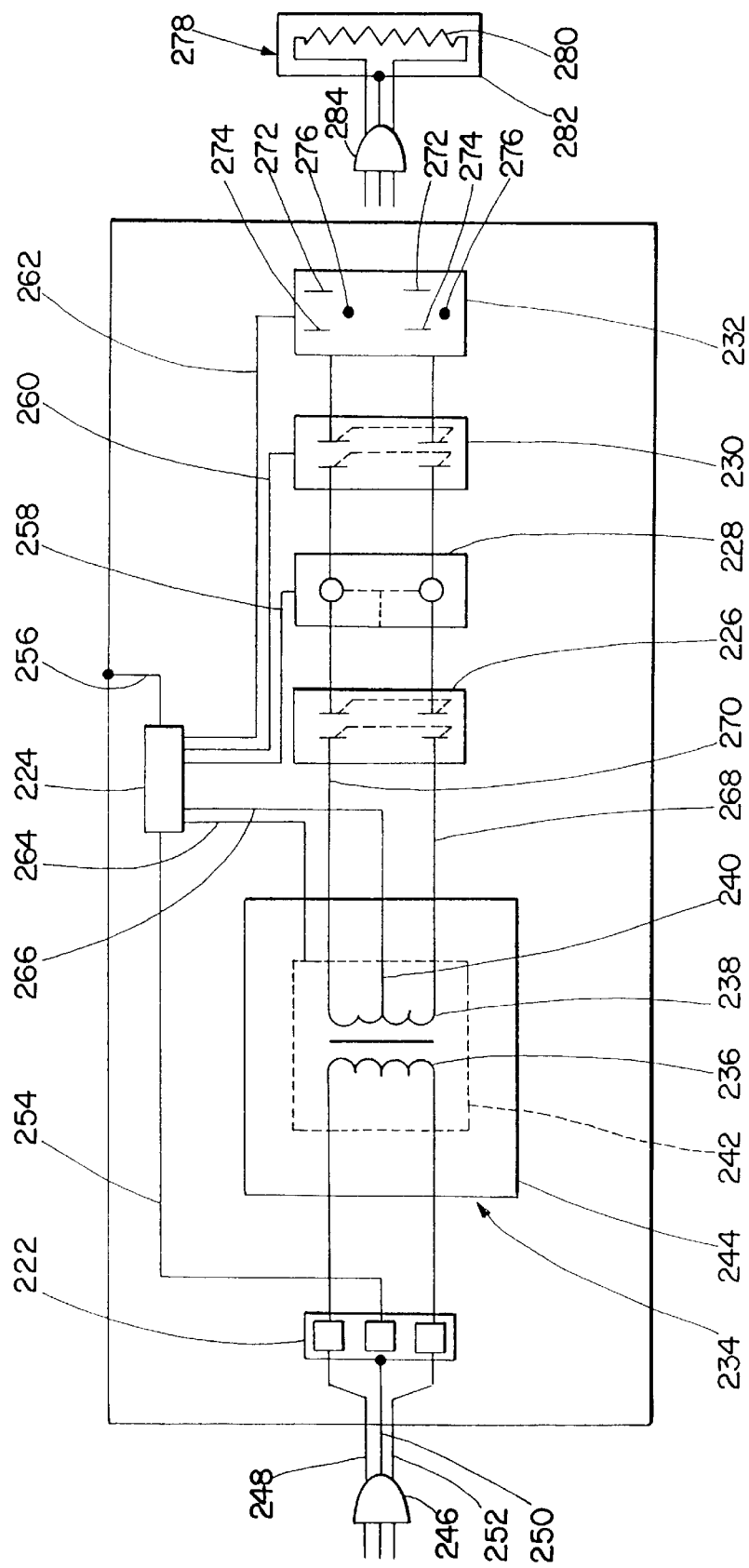
FIG. 7 is a diagram illustrating the practice of the basic invention to provide a symmetrical power system in a standard equipment rack chassis in which an electrically insulated transformer frame for an isolation transformer is mounted to the system chassis and is powered by a conventional three-wire ac input.

Referring now to FIG. 7, there is shown a diagram illustrating a standard equipment rack chassis which embodies a symmetrical power system according to the basic invention, and in which an electrically insulated transformer frame for an isolation transformer is mounted to the chassis and powered by a conventional single phase three wire ac input. In FIG. 7, a standard equipment rack chassis 220 has mounted thereon an input terminal block 222, a ground bus 224, a 2 pole circuit breaker of the common trip type 226, and EMI/RFI filter 228, a ground fault circuit interrupter breaker of the common trip type 230, and a power output receptacle 232. A transformer 234 having a primary winding 236 and a secondary winding 238 with a center tap 240 has a shield 242 about the windings 236, 238 and is contained within a transformer frame 244. The transformer frame 244 is mounted to the chassis 220 so as to be electrically insulated therefrom. A standard 3 wire ac input plug 246 has line, ground, and common leads 248, 250, 252, respectively, connected to the terminal block 222, so as to apply power to the primary winding 236 of the transformer 234 when the input plug 246 is plugged into an ac power source. The ground lead 250 is connected to the ground bus 224 by a lead 254. Grounding leads 256, 258, 260, 262, 264 are connected between the ground bus 224 and the chassis 220, filter 228, ground circuit interrupter (GFCI) 230, and output receptacle 232, respectively. Lead 264 is connected between the shield 242 and the ground bus 224. Lead 266 is connected between the secondary winding center tap 240 and the ground bus 224. The symmetrical power output from the secondary winding 238 is applied to a pair of output leads 268, 270, which pass through the circuit breaker 226, filter 228, and GFCI 230 to the output receptacle 232. The output receptacle 232 has a pair of first output voltage slots 272, a pair of second output voltage slots 274, and a pair of ground recesses 276 which are connected to the output leads 268, 270 and the ground lead 262 respectively, by conventional means (not shown). In operation, application of a conventional three wire ac input to the input plug 246 will result in the application of a symmetrical output power to the output receptacle 232. An output load 278, illustrated as a resistor 280 mounted so as to be electrically insulated from a load chassis 282 is electrically connected to a plug 284 which is complementary to the output receptacle 232, so that, when plugged therein, symmetrical power is applied to the resistor 280 while the maximum voltage between the resistor 280 and the load chassis 282 is one-half that which would otherwise exist if conventional power in a transverse or differential mode were applied to the load 278.

Figure 8:
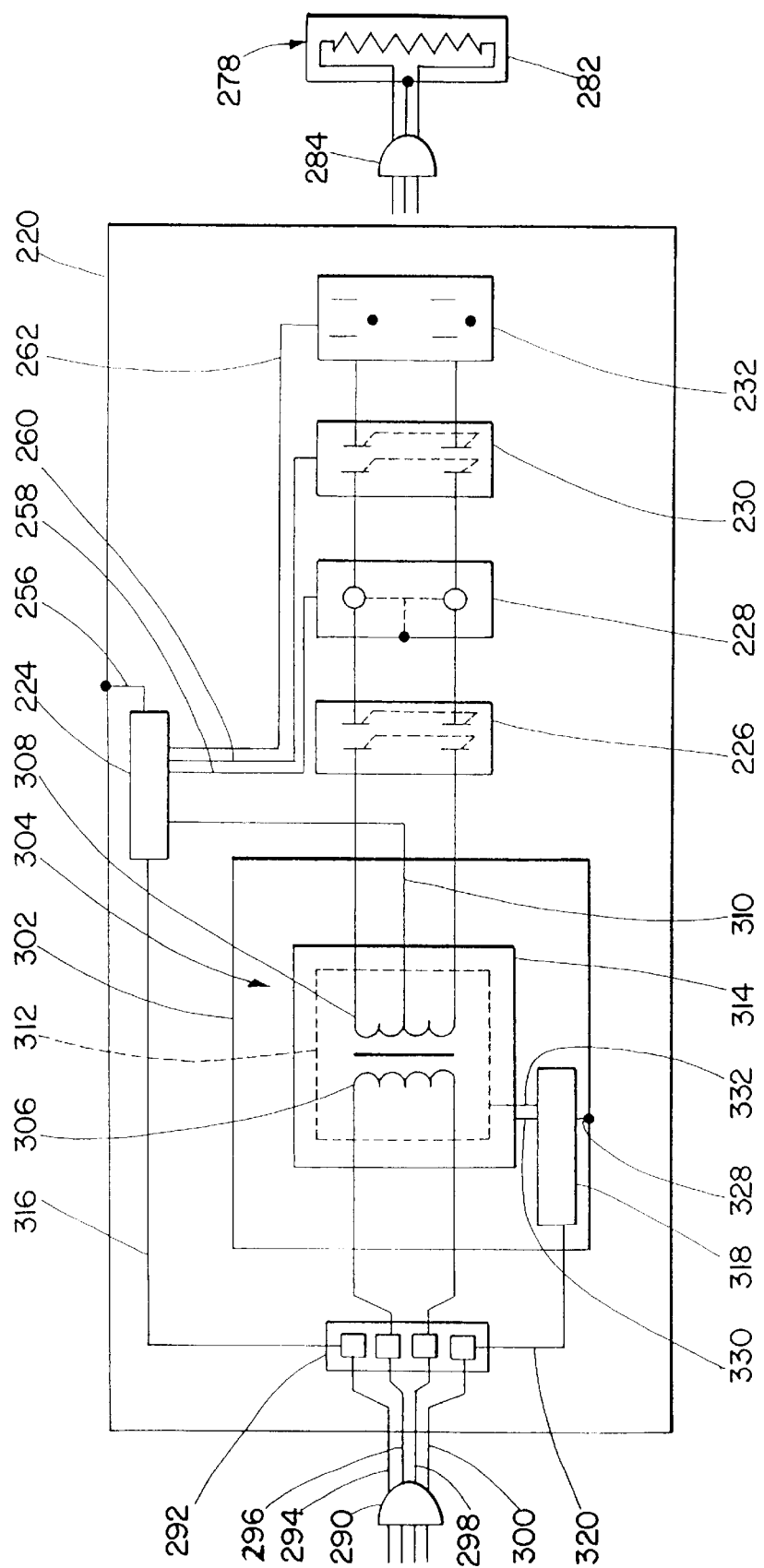
FIG. 8 is a diagram illustrating the practice of the invention to provide a symmetrical power system in a standard equipment rack chassis in which a non-insulated transformer frame is mounted to an inner chassis which is electrically isolated from the outer chassis and is powered by a conventional four-wire ac input.

Referring now to FIG. 8, there is shown a diagram illustrating a symmetrical power system in a standard equipment rack chassis in which a non-insulated transformer frame is mounted to an inner chassis which is electrically insulated from the outer chassis. In FIG. 8, certain components are identical to those in FIG. 7 and have like reference numerals. A conventional four wire ac input plug 290 is connected to an input terminal block 292 by four input leads 294, 296, 298, 300. When the plug 290 is plugged into a standard simple phase four wire ac input, the leads 296, 298 are connected to the line and common leads of the ac input, the lead 300 is connected to the nominal ground for the line and common leads, and the lead 294 is connected to the earth ground for the ac power input. An inner chassis 302 is attached to the chassis 220 so as to be electrically isolated therefrom. The inner chassis has attached thereto a transformer 304 which includes a primary winding 306, a secondary winding 308 with a center tap 310, the secondary winding preferably being bifilar wound to maximize the advantages of the basic invention. A shield 312 encloses the windings 306, 308 and a transformer frame 314 encloses a shield. A lead 316 extends between the ground bus 224 and the terminal block 292, so as to connect the ground lead 294 to the ground bus 224, thereby providing a technical equipment ground reference for the transformer secondary winding center tap 310 and the filter 228, GFCI 230 and output power receptacle 232. A second ground bus 318 is attached to the inner chassis 302, and is electrically connected to the terminal block 292 by a lead 320 so as to electrically connect the ground lead 300 to the second ground bus 318. Leads 322, 324 and 326 are connected between the second ground bus 318 and the inner chassis 302, the transformer frame 314, and the shield 312 by leads 328, 330 and 332 respectively.

The symmetrical power system of FIG. 8 functions generally similarly to the symmetrical power system heretofore described with respect to FIG. 7, except that the system of FIG. 8 has a non-insulated transformer frame which is mounted to an inner chassis so as to be electrically isolated from the main chassis. Separate grounds are provided for the symmetrical power system output components and the ac input equipment.

Figure 9:
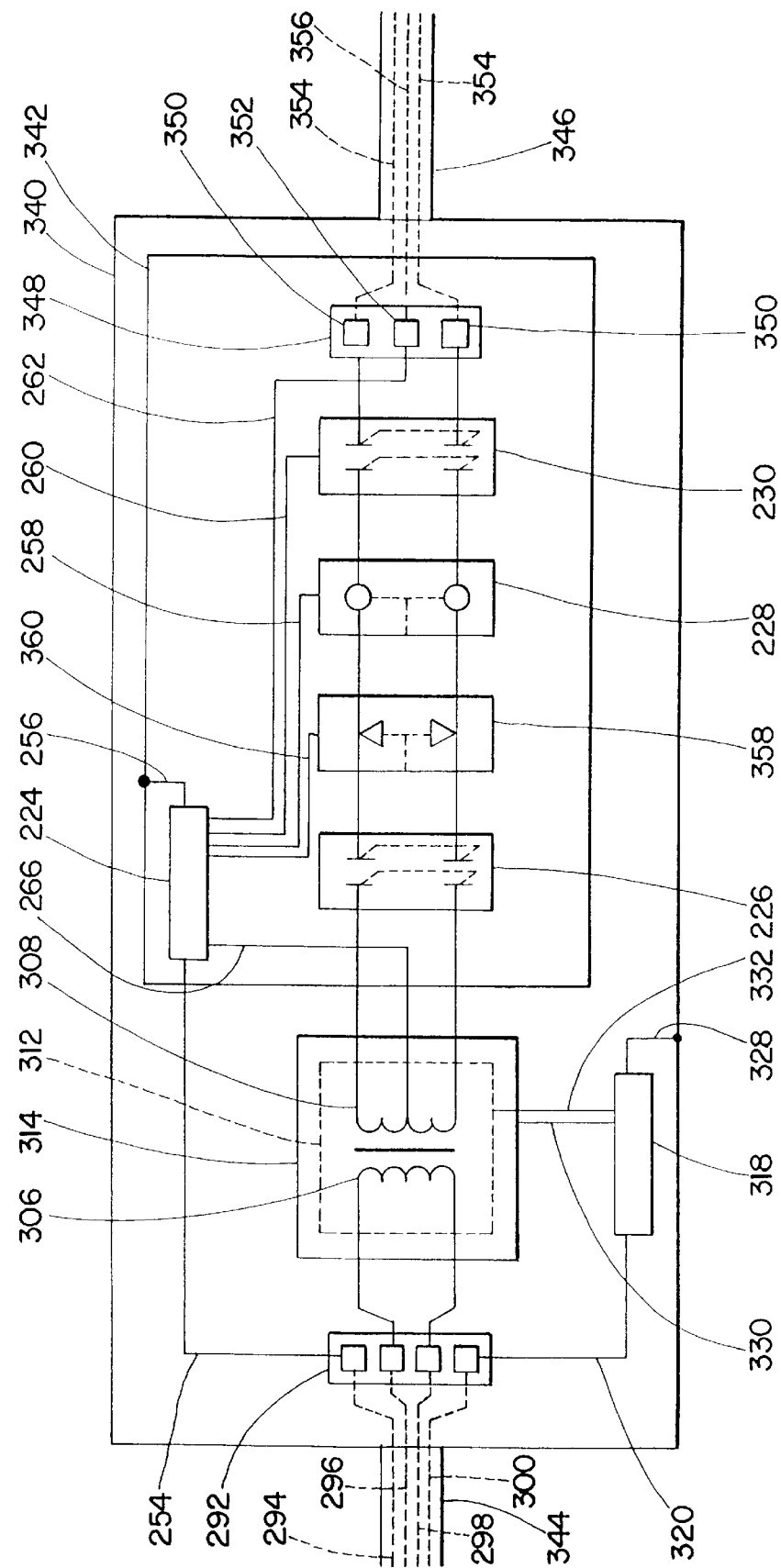
FIG. 9 is a diagram illustrating the practice of the invention to provide a symmetrical power system in a wall-mounted or floor-standing cabinet having a conventional four-wire ac input.

Referring to FIG. 9, there is shown a diagram illustrating a symmetrical power system utilizing the basic invention in a wall mounted or floor mounted standing cabinet so as to be permanently wired. In FIG. 9, components identical to those in FIG. 7 or 8 are identically numbered. The symmetrical power system of FIG. 9 has a chassis 340 to which an inner chassis 342 is connected so as to be electrically therefrom. A single phase four wire ac input is applied to the input terminal block 292 by the leads 294, 296, 298, 300, which are contained within a field installed conduit 344. A power output conduit 346 is also attached to the chassis 340. An output terminal block 348 having a pair of output terminals 350 adapted to receive the symmetrical power output voltage and a ground terminal 352 have connected thereto output leads 354, 356 respectively which pass through the output conduit 346 for application of the symmetrical output voltage to other electronic or electrical equipment. The includes FIG. 9 includes a transient voltage surge suppressor 358 which is electrically connected between the circuit breaker 226 and the filter 228 to provide transient voltage surge protection in the output circuit. The transient voltage surge suppressor 358 is connected to the ground bus 224 by a lead 360. Such protection may be incorporated, if desired, in the circuits of FIGS. 7 and 8. For example, the output receptacle 232 may include a transient voltage surge suppressor in these embodiments.

The operation of the system shown in FIG. 9 is generally similar to the operation of the system shown in FIG. 8. The ground bus 224 provides a ground reference for the technical equipment which is separate from the ground reference for the ac equipment provided by the second ground bus 318.

Figure 11:
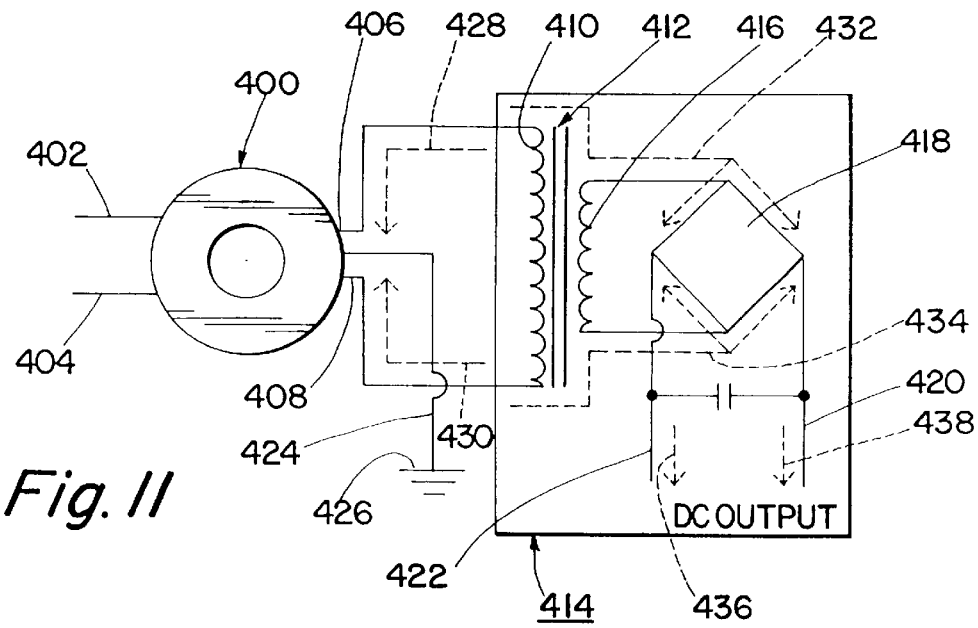
FIG. 11 is a diagram of a circuit for the use of the basic invention to provide a symmetrical power system to alternate high frequency ripple currents in ac to dc power conversion circuits.
Figure 10:
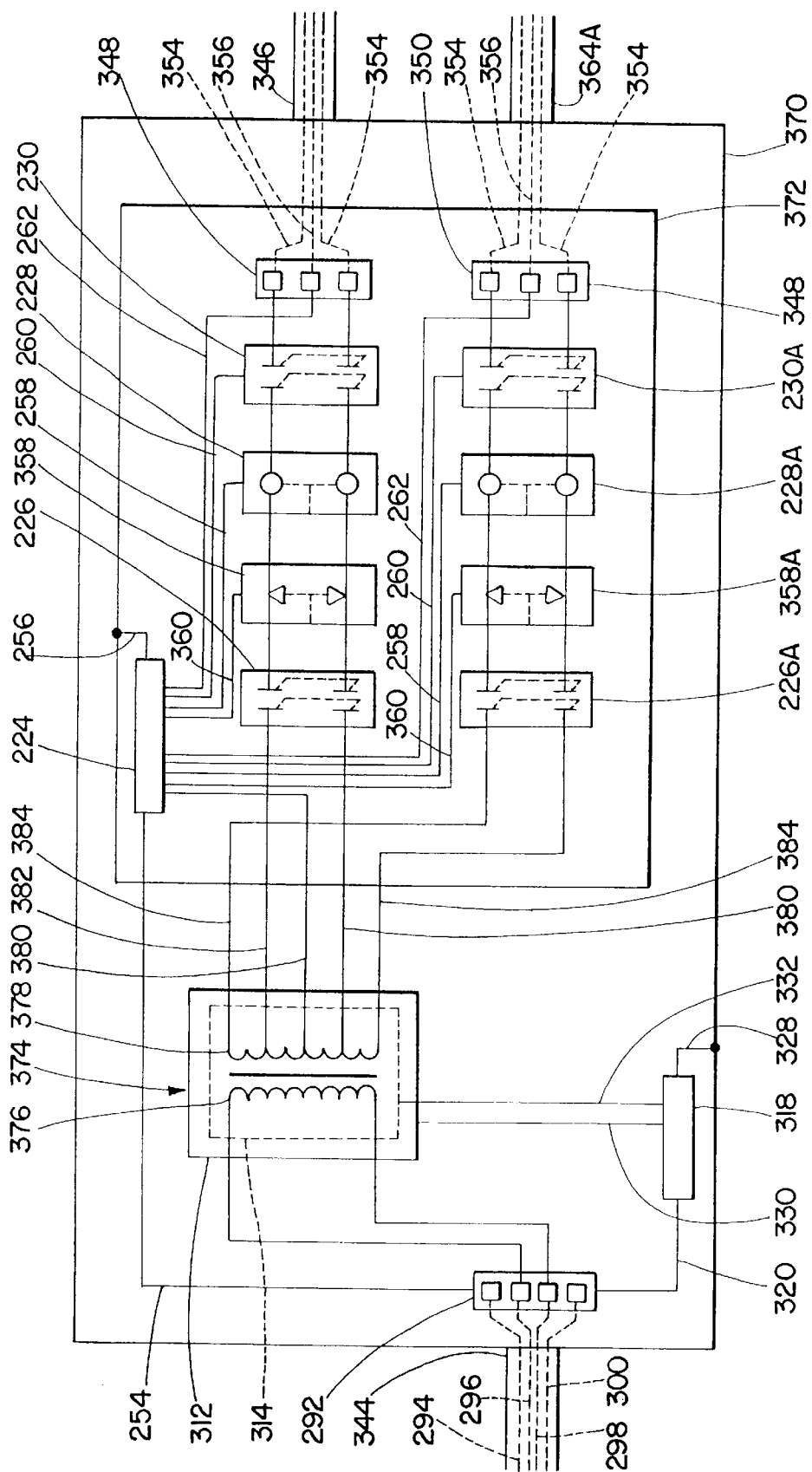
FIG. 10 is a diagram illustrating the practice of the basic invention to provide a symmetrical power system in a wall or floor-mounted standing cabinet having a dual output voltage requirement and which is supplied by a conventional single-phase four-wire ac input.

Referring now to FIG. 10, there is shown a diagram of a symmetrical power system according to the basic invention embodied in a wall or floor mounted standing cabinet, so as to provide a symmetrical power system with dual output symmetrical voltages. In FIG. 10, certain of the components are identical to those previously referred to with respect to FIGS. 7, 8 or 9, and have like reference numerals. FIG. 10 is a diagram of a system similar to that shown in FIG. 9, except that, in FIG. 10, the isolation transformer has dual output voltage windings so as to provide for symmetrical power outputs of, for example, 120 volts and 208 volts. In FIG. 10, a chassis 370 as an inner chassis 372 attached thereto so as to be electrically isolated therefrom. A transformer 374 has an input winding 376 which is electrically connected to the input leads 296, 298 at the terminal 292. The transformer 374 has dual output secondary winding 378 which may be similar, for example, as that heretofore described with respect to FIG. 2 in order to maximize the advantages of the basic invention. Alternatively, two separate secondary windings may be utilized, which are each preferably bifilar-wound, in order to maximize the advantages gained in the practice of the basic invention by utilization of bifilar winding of the center-tapped secondary winding. However, for purposes of ease of illustration, the secondary winding 378 is shown in conventional form and has a center tap 380, a pair of first output winding leads 382 which may, for example, provide a voltage output of 120 volts and a pair of second output winding leads 384 which may provide, for example, an output voltage of 208 volts. Inasmuch as the voltage across the output leads 384 will be substantially higher than the voltage across the output leads 382, the circuit breaker 226A, transient voltage surge suppressor 358, filter 288, and ground fault circuit interrupter 230 of FIG. 9, if rated for 120 volts, would not be suitable, and are replaced by a circuit breaker 226A, a transient voltage surge suppressor 358A, a filter 228A, and a ground fault circuit interrupter 230A of adequate voltage rating for the 208-volt signal applied thereto. These circuits of FIG. 10 perform in the same manner as heretofore described with respect to FIG. 9, except that a conduit 346A contains leads 354, 356, which carry a 208 volt output, rather than a 120 volt output. Referring now to FIG. 11, there is shown a diagram of a symmetrical power system according to the basic invention which attenuates high frequency ripple currents which are often emitted from dc power supply circuits, commonly found in many types of electronic apparatus. In FIG. 11, an isolation transformer 400 has a pair of power input leads 402, 404, which apply ac power from an ac power source (not shown) to a primary winding (not shown) of the transformer 400. The transformer 400 has a center-tapped secondary winding (not shown) to which a pair of secondary winding output leads 406, 408 are connected so as to apply the output of the secondary winding to an input winding 410 of a power transformer 412 contained in an ac to dc power converter 414. The transformer 412 has a secondary winding 416, the output of which is applied to a conventional rectifier, such as a bridge rectifier 418, to produce a dc output across a pair of rectifier output leads 420, 422. The transformer 400 secondary winding is preferably bifilar-wound to maximize the advantages of the practice of the basic invention. The center tap (not shown) is connected to a grounding lead 424 so as to connect the center tap of the secondary winding to a reference ground 426.

In operation, the energization of the transformer 412 results in balanced reactive currents illustrated by the dotted lines 428, 430, respectively flowing in the leads 406, 408, which are equal but inversely phased, and high frequency ripple currents illustrated by the dotted lines 432, 434 flowing in the circuitry of the transformer 412 and bridge rectifier 418 which are equal and inversely phased. Similarly, the dc output in the leads 420, 422 may carry high frequency ripple currents 436, 438 which are equal and inversely phased so as to cancel one another out when applied to the electronic circuitry receiving the dc output of the system shown in FIG. 11.

Figure 12:
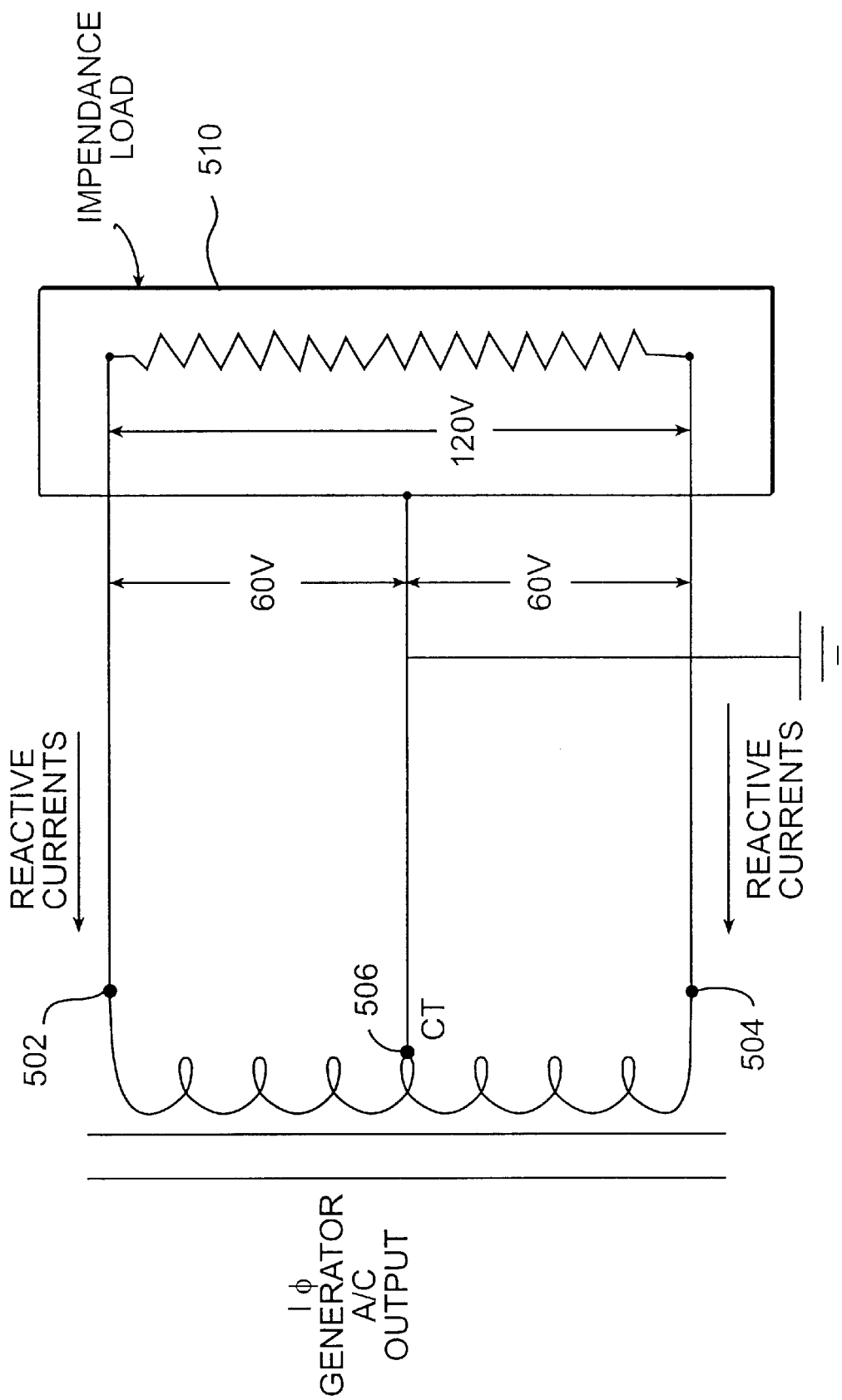
FIG. 12 is a circuit diagram of the present invention configured as a single phase a/c generator.

The symmetrical power implementation may be used not only with line current, but also with the output of a generator, with the output coils of the generator configured to share a center tap, with one-half of the voltage present across each coil. As shown in FIG. 12, a center tap 506 is located at the mean voltage differential (or mid-phase point) between the two rated single-phase output terminals 502 and 504 of the generator. In the embodiment shown, each output coil of the generator generates 60 volt-to-ground potential and 120 volts appears across the two terminals to drive impedance load 510. "Ground," of course, may only be a functional ground, in the case of a generator used in an airplane or the like.

Figure 13:
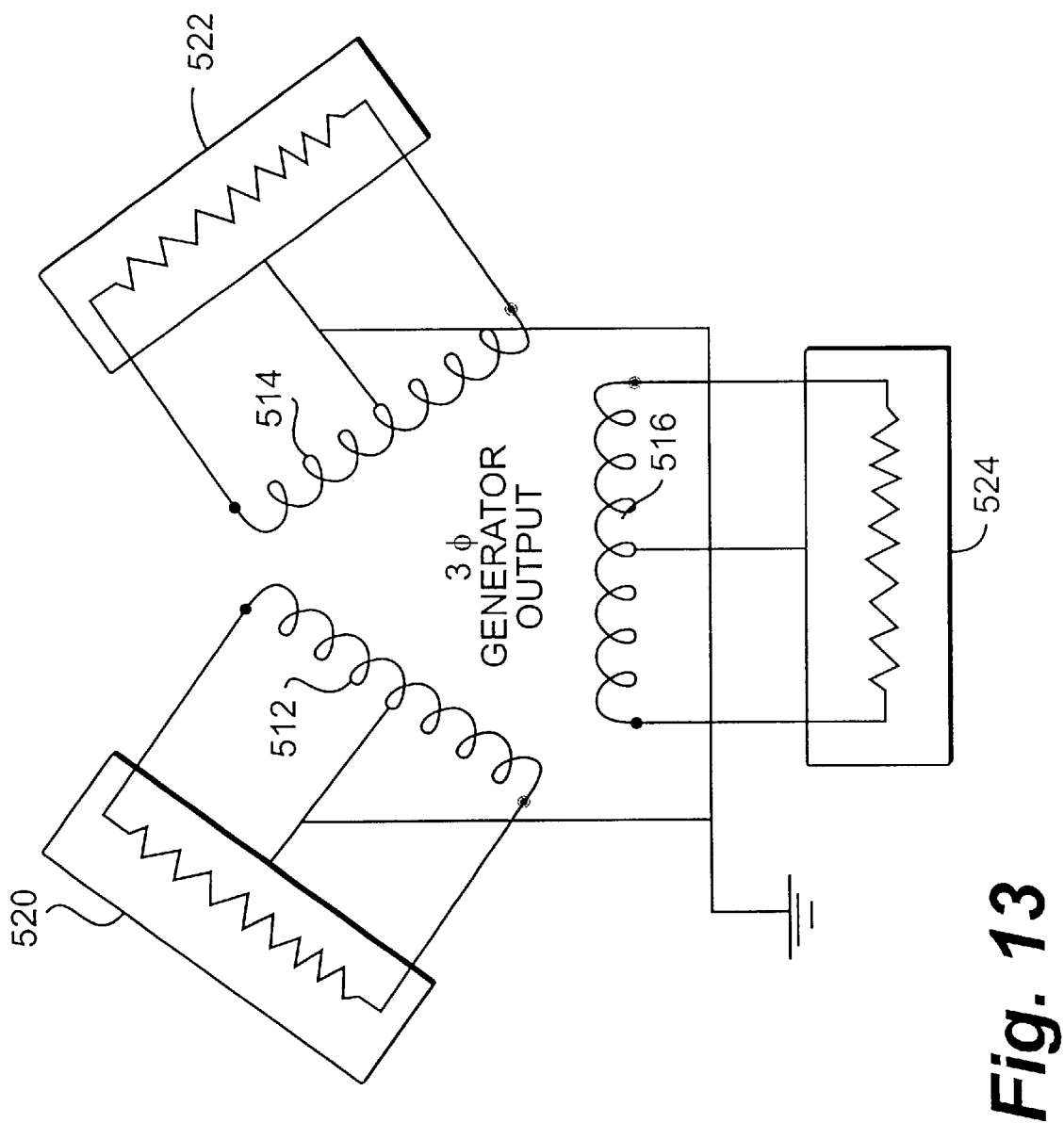
FIG. 13 is a circuit diagram of the present invention configured as a three phase generator with a six-phase wye symmetrical output.

Similarly, as shown in FIG. 13, when a generator that produces more than one phase is configured in accordance with the invention, it becomes a symmetrical, multi-phase generator. A six-phase wye generator configuration is shown in FIG. 13, where the three phase coils, 512, 514, and 516 of a three-phase generator are each center-tapped and grounded. The ends of the coils are then applied to the impedance loads 520, 522 and 524. This configuration is similar to that shown in U.S. Pat. No. 5,969,510, issued to the inventor of the present invention.

Symmetrical power systems according to the invention are utilizable in many of areas of industry, including recording and sound reinforcement, video and film production, broadcasting, communications, manufacturing, research, product development, educational, medical, data processing, commercial lighting and military applications. The invention may also be utilized to attenuate electrical interference in a sensitive electronics facility where more than one voltage or system is required by the electrical equipment in the area by means of providing a symmetrical power system having multiple balanced output voltage circuits derived from a single transformer so as to be more frequency and phase aligned by virtue of being inductively coupled to one magnetic flux source.

The invention may be utilized to attenuate RFI emissions from electronic circuits and components by providing symmetrical circuit power to the interference source where applicable, thereby balancing RFI emissions which cannot thereafter propagate in the usual manner but instead collapse by virtue of the equal presence of inversely phased RFI emissions.

The invention may be utilized to provide increased output signal stability and less distortion in the operation of various types of dc-to-ac inverter systems and ac power conditioning systems by applying the output of the inverter system to a symmetrical system output transformer, which inhibits the distorting effects of non-linear reactive loading on the inverter circuitry by balancing and nulling at the grounding reference non-linear reactive-load currents and related power artifacts which commonly cause power distortion in the inverter's output.

The invention may be utilized to limit the propagation of high frequency interference by applying a symmetrical power system to impedance loads to attenuate lower frequency harmonics which then null at ground and which that would otherwise propagate and generate ever higher harmonics, "echoing" or "bouncing" back and forth between the power source impedance and the load impedance until the reactive energy has been "dissipated" or spread across a wide bandwidth as is commonly observed in many conventional single phase power circuit applications.

As used herein, the term "isolation transformer" includes step-up and step-down transformers, as well as transformers whose output voltage and input voltage are identical. Also, the terms "primary coil" and "primary winding" are used interchangeably herein as are the terms "secondary coil" and "secondary winding."

I claim:

1. An improved ac generator, said generator comprising:

an output winding having a pair of output terminals;

a center tap terminal located at the point of mean voltage differential between the two output terminals of said output winding, wherein said center tap terminal is grounded;

each of said output terminals of said output winding being connected to an input terminal of said impedance load, wherein said impedance load is grounded.

2. An improved ac generator as in claim 1, wherein said generator is a three phase generator having three output windings, and each of said output windings of said generator is configured such that a center tap terminal is located at the point of mean voltage differential between each of its two output terminals; each center tap terminal is grounded; and each of said output terminals is connected to an input terminal of a three-phase impedance load.

3. A method for improving the performance of an electrical system which includes an ac generator power source having an output winding between two output terminals, said system being connected to an impedance load, said method comprising:

configuring said output winding of said generator such that it comprises a center tap terminal located at the point of mean voltage differential between the two output terminals of said output winding;

grounding said center tap terminal;

connecting each of said output terminals of said output winding to an input terminal of said impedance load; and grounding said ground terminal of said impedance load.

4. A method as in claim 3, wherein said generator is a three phase generator having three output windings, said method comprising configuring each of said output windings of said generator such that a center tap terminal is located at the point of mean voltage differential between each of its two output terminals;

grounding each said center tap terminal;

connecting each of said output terminals of each said output winding to an input terminal of a three phase impedance load; and grounding each ground terminal of said impedance load.

* * * * *